United States Patent [19]

Popov et al.

[11] Patent Number: 5,001,380
[45] Date of Patent: Mar. 19, 1991

[54] ROTOR FOR AN ASYNCHRONOUS MOTOR WITH MULTIPLE LAYERED SCREEN

[76] Inventors: Nikolai P. Popov, prospekt Ispytatelei, 31, korpus I, kv. 507; Grigory N. Klotsvog, ulitsa Gavanskaya, 11, kv. 43; Andrei D. Plotnikov, prospekt Nastavnikov, 25, korpus 3, kv. 101; Israfil T. Talyshinsky, ulitsa Serdobolskaya, 11, kv. 65; Evgeny A. Tretyakov, ulitsa Yablochkova, 3, kv. 31, all of Leningrad, U.S.S.R.

[21] Appl. No.: 333,627

[22] PCT Filed: Apr. 28, 1988

[86] PCT No.: PCT/SU88/00106
§ 371 Date: Apr. 4, 1989
§ 102(e) Date: Apr. 4, 1989

[87] PCT Pub. No.: WO88/10021
PCT Pub. Date: Dec. 15, 1988

[30] Foreign Application Priority Data

Jun. 5, 1987 [SU] U.S.S.R. ............... 4257349

[51] Int. Cl.$^5$ .............. H02K 1/22; H02K 17/02; H02K 1/00
[52] U.S. Cl. .................. 310/261; 310/197; 310/212; 310/216; 310/265
[58] Field of Search ............... 310/172, 197, 212, 216, 310/261, 263, 264, 265, 266, 271

[56] References Cited

U.S. PATENT DOCUMENTS 4,409,506 10/1983 Ito et al. ............... 310/261

FOREIGN PATENT DOCUMENTS 0936224 6/1982 U.S.S.R. .............. 310/261
1334273 8/1987 U.S.S.R. .
2035715 6/1980 United Kingdom .

OTHER PUBLICATIONS

"Elektricheskie mashiny", by Ju. A. Kulik, Vysshaya Shkola (Moscow), 1966, pg. 243.
Elektrichestvo, No. 2, 1926, (Moscow), Shenfer, "Rotor asinkhronnogo dvigatelya v vide massivnogo zheleznogo tsilindra", pp. 86–90.
Elektrotekhnika, No. 3, 1970, (Moscow), by V. S. Mogilnikov et al., "Perspektivy uluchshenia kharakteristik asinkhronnykh dvigatelei s massivnym rotorom", pp. 13–16.

Primary Examiner—Steven L. Stephan
Assistant Examiner—C. LaBelle
Attorney, Agent, or Firm—Fleit, Jacobson, Cohn, Price, Holman & Stern

[57] ABSTRACT

An asynchronous motor comprising a stator 1, a rotor including a core 2 and a multilayer screen 3. Each layer 4 of the screen 3 is made of an iron-containing alloy of high electrical conductivity, the value of electrical conductivity in each of the succeeding layers, in the direction of the rotor axis, being assumed to be decreasing.

3 Claims, 1 Drawing Sheet

ROTOR FOR AN ASYNCHRONOUS MOTOR WITH MULTIPLE LAYERED SCREEN

FIELD OF THE INVENTION

The invention relates to electrical engineering, and more particularly to electric asynchronous motors with a solid electromagnetic rotor. The present invention can be most successfully used in electric drives designed to control pipeline valves or other apparatus, where it is required to provide a high starting torque of the motor and the minimum dynamic overloads in the actuator, as the motor is braked.

PRIOR ART

Currently, an extensive use of asynchronous motors is caused by their being simple in construction and reliable in operation. The serious drawbacks of asynchronous motors, however, reside either in their low starting torque or in a high nominal rotational speed of the rotor. These disadvantages both result in certain negative effects in the actuator that is to be controlled by the asynchronous motor. The low starting torque of the motor fails to ensure a reliable removal of the stop member from the valve seal, while the high nominal rotational speed of the rotor leads to significant dynamic overloads occurring in the actuator as a result of a hard braking of the motor. Consequently, the development of asynchronous motors designed to control the valves aims to increase the starting torque and reduce the nominal rotational speed of the rotor.

Known in the art are asynchronous motors comprising a stator and a rotor formed by a solid ferromagnetic cylinder ("Elektrichestvo", No. 2, 1926, (Moscow), K. L. Shenfer "Rotor asinkhronnogo dvigatelya v vide massivnogo zheleznogo tsilindra", pp. 86–90).

Such motors feature a small starting torque resulting from a high value of the starting resistor of the rotor, which is due to a low electrical conductivity of the rotor material. Therefore, the use of such motors in the drives for controlling the apparatus that requires a large starting torque, such as the stop valves of the pipelines, results in degradation of mass-and-size performance of the driving means.

Also known is an asynchronous motor comprising a stator, a rotor including a core and a screen rigidly attached thereto and composed of an iron-containing alloy of high electrical conductivity ("Elektrotekhnika", No. 3, 1970, (Moscow), V. S. Mogilnikov, A. N. Strelnikov "Perspektivy uluchshenia kharakteristik asinkhronnykh dvigatelei s massivnym rotorom").

The provision of a screen in said rotor, which is made of an iron-containing alloy of high electrical conductivity, brings about an increase in the starting torque of the motor. This increased starting torque of the motor, however, results in a higher nominal rotational speed of the rotor, i.e. the speed developed under steady-state conditions of motor operation. Since the closure of the stop valves is accompanied by a hard braking of the motor with its rotor moving at a high speed, large dynamic overloads are produced in the stop valves, whereby the reliability of valve operation is impaired.

DISCLOSURE OF THE INVENTION

The principal object of the invention is to provide an asynchronous motor including a rotor with its screen so designed that, while maintaining a sufficiently high starting torque of the motor, the nominal rotational speed of the rotor is caused to be reduced with the consequent decrease of dynamic overloads in the actuator, as the rotor is braked, thus ensuring a more reliable operation of the valves.

With this principal object in view there is provided an asynchronous motor comprising a stator, a rotor including a core and a screen rigidly mounted thereon and composed of an iron-containing alloy of high electrical conductivity, wherein, according to the invention, the screen exhibits a multilayer structure, each succeeding layer in the direction towards the rotor axis being made with a decreasing electrical conductivity.

The multilayer structure of the rotor screen with the electrical conductivity of each layer decreasing towards the rotor axis brings about an increased rotor resistance as compared to the single-layer screen of the same thickness as the multilayer one. The nominal moment at the rotor is known to be proportional to the rotor current, and the rotor current is proportional to the resistance and the rotational speed of the rotor. In the hard braking mode of operation, the reduced rotational speed of the rotor minimizes the dynamic overloads developed in the stop valves as they are closed, thus resulting in an increased reliability of the valves.

SUMMARY OF THE DRAWINGS

The present invention will be more clearly understood on consideration of the following detailed description of an embodiment of the asynchronous motor, according to the invention, with reference to the accompanying drawings, in which.

BEST MODE OF CARRYING OF THE INVENTION INTO EFFECT

Figure 1:
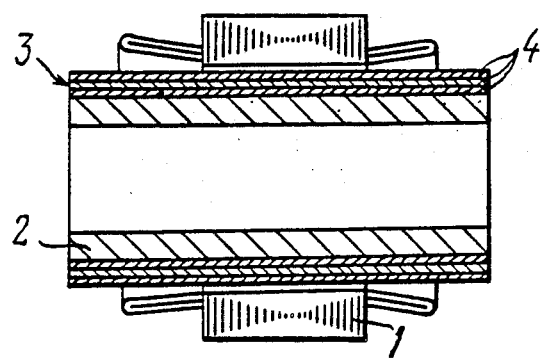
FIG. 1 is a sectional view of an asynchronous motor, according to the invention.

An asynchronous motor comprises a stator 1 (FIG. 1) with a rotor placed inside and including a ferromagnetic core 2 and a screen 3 rigidly mounted thereon and shaped to match the core. The screen 3 consists of several layers. Each layer 4 of the screen 3 is composed of an iron-containing alloy of high electrical conductivity, which is achieved by the presence of high-conductivity components, such as copper, in the alloys constituting the screen layers. The electrical conductance value of each succeeding layer as directed towards the rotor axis is assumed to be decreasing.

The calculation of the desired mechanical characteristic of the proposed motor is made on the assumption of a specified initial characteristic defined by the actuator parameters. As the first step of calculation, the number of screen layers and the electrical conductivity of each particular layer are appropriately chosen. Based on the calculation results, an estimated mechanical characteristic is plotted. If the characteristic obtained to meet the specification, both the number of screen layers and the electrical conductance value of each layer are changed. The process continues until the original design characteristic is produced approximating the specified characteristic in the best possible way.

Figure 2:
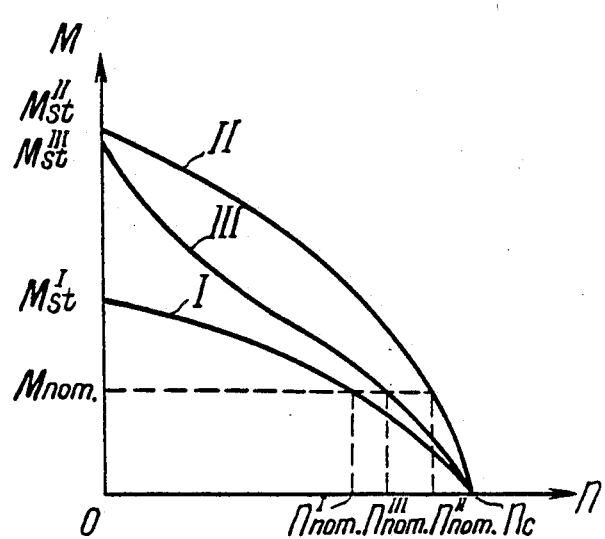
FIG. 2 shows mechanical characteristics of asynchronous motors including a screenless rotor, a rotor provided with a single-layer screen, and a rotor provided with a multilayer screen.

FIG. 2 represents comparative mechanical characteristics illustrating the moment M at the rotor as a function of the rotational speed n of the rotor. Curve I demonstrates this relationship for an asynchronous motor with a screenless rotor, curve II corresponds to a motor including a rotor provided with a single-layer screen, and curve III, to a motor including a rotor provided with a multilayer screen. It should be clear from comparison of there curves, that the mechanical characteristic III of the proposed motor, within the low-speed range, i.e. in the motor acceleration mode, approximates the mechanical characteristic II of the motor, equipped with a single-layer screen. Thereby satisfactory motor startup properties are achieved, i.e. the high starting torque $M_{st}$.

For nominal rotational speeds $n_{nom}$ of the rotor, the mechanical characteristic III of the proposed motor approximates the mechanical characteristic I of the motor with screenless rotor. The nominal speed $n_{nom}$ of the proposed rotor is then substantially reduced, resulting in lower dynamic overloads in the actuator, when the motor is suddenly braked.

During the startup of the motor, the electromagnetic wave, due to a pronounced surface effect in the ferromagnetic rotor, penetrates the rotor body to a comparatively small extent (2 to 3 mm), for example, to the depth of the first outer layer. At the point, the rotor resistance is $\tau_{st}$. As the rotational speed of the rotor increases, the frequency of the rotor current is reduced, resulting in a greater penetration depth of the electromagnetic wave into the rotor body. For example, let the electromagnetic wave penetration depth, for some rotational speed, n, of the rotor, be doubled. In this case, when there is no screen on the rotor, or if the screen is a single-layer one and has a uniform electrical conductivity over the entire thickness of the screen, the electrical resistance of the rotor is reduced to a value $\tau$ equal to $\tau_{st}/2$. On the other hand, if the rotor is provided with a multilayer screen that exhibits a decreasing electrical conductivity of the layers as looking in the direction towards the rotor axis, the electrical resistance of the rotor is maintained at an approximate level of $\tau_{st}$. As the rotational speed of the rotor is further increased to reach the nominal value, the frequency of the rotor current keeps on decreasing, the electromagnetic wave penetration depth grows, but the electrical resistance of the rotor is still maintained about $\tau_{st}$ because of a decreasing electrical conductivity of each succeeding layer of the screen as one moved towards the rotor axis.

Thus the increased electrical resistance of the rotor, while providing the required nominal moment $M_{nom}$ at the rotor, would lead to a reduced rotational speed of the rotor. The decrease of the rotational speed causes the dynamic loads in the stop valves to be reduced, as the valves are closed during the hard braking of the motor, which results in a highly reliable valve system.

INDUSTRIAL APPLICABILITY

The present invention can be most successfully used in electric drives designed to control pipeline valves or other apparatus, where it is required to provide a high starting torque of the motor and minimum dynamic overloads, when the motor is being braked.

We claim:

1. An asynchronous motor comprising a stator, a rotor including a core and a circumferential screen rigidly mounted thereon and composed of an iron-containing alloy of high electrical conductivity, characterized in that the screen is of multilayer type, each succeeding layer in the direction towards the rotor axis being made with a decreasing electrical conductivity and each layer having a radial thickness which is smaller than the radial thickness of the core.

2. A motor as defined in claim 1 wherein the core is tubular.

3. An asynchronous motor comprising a stator, a rotor including a core and a circumferential screen rigidly mounted thereon and composed of an iron-containing alloy of high electrical conductivity, characterized in that the screen is of multilayer type, each succeeding layer in the direction towards the rotor axis being made with a decreasing electrical conductivity and at least the outermost layer having a radial thickness commensurate with the depth of penetration of an electromagnetic wave into the rotor on start-up of the motor.

* * * * *